United States Patent
Moyer et al.

(10) Patent No.: US 6,925,542 B2
(45) Date of Patent: Aug. 2, 2005

(54) MEMORY MANAGEMENT IN A DATA PROCESSING SYSTEM

(75) Inventors: William C. Moyer, Dripping Springs, TX (US); Ray Marshall, Hertfordshire (GB)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/393,592

(22) Filed: Mar. 21, 2003

(65) Prior Publication Data

US 2004/0186973 A1 Sep. 23, 2004

(51) Int. Cl.[7] .............................................. G06F 12/00
(52) U.S. Cl. ....................... 711/167; 711/200; 711/202; 711/203; 711/206; 711/207; 711/209; 711/102; 711/103
(58) Field of Search ................................ 711/167, 200, 711/202, 206, 203, 207, 209, 102, 103, 106; 710/25; 716/6; 345/99

(56) References Cited

U.S. PATENT DOCUMENTS

| | | | | |
|---|---|---|---|---|
| 5,418,924 A | * | 5/1995 | Dresser | 713/600 |
| 5,440,710 A | * | 8/1995 | Richter et al. | 711/207 |
| 5,553,144 A | * | 9/1996 | Almquist et al. | 713/100 |
| 5,623,648 A | | 4/1997 | Childs | |
| 5,809,340 A | * | 9/1998 | Bertone et al. | 710/58 |
| 6,073,223 A | | 6/2000 | McAllister | |
| RE37,305 E | * | 7/2001 | Chang et al. | 711/207 |
| 6,438,670 B1 | * | 8/2002 | McClannahan | 711/167 |
| 6,453,434 B2 | * | 9/2002 | Delp et al. | 714/718 |
| 6,505,282 B1 | * | 1/2003 | Langendorf et al. | 711/170 |

* cited by examiner

*Primary Examiner*—Matthew D. Anderson
*Assistant Examiner*—Zhuo H. Li
(74) *Attorney, Agent, or Firm*—Susan C. Hill; Robert L. King

(57) ABSTRACT

Memory management in a data processing system (10) is achieved by using one or more timing bits (54) to specify a timing parameter of a memory (18, 19, 34). To implement this in some embodiments of the present invention, a memory array (32, 33, 42) is multiple-mapped in the physical memory map (70) of processor (12) and the address bits (54) associated with the multiple-mapping are used to directly control timing parameters of the memory arrays (32, 33, 42). This allows for flexible timing specifications to be derived quickly on an access by access basis without requiring any additional control storage overhead.

21 Claims, 3 Drawing Sheets

MEMORY MANAGEMENT IN A DATA PROCESSING SYSTEM

FIELD OF THE INVENTION

The present invention generally relates to a data processing system, and more particularly, to memory management in a data processing system.

RELATED ART

It is not uncommon for a data processing system to include a variety of memories, some of which may have different timing specifications. Some of these memories may use a very small portion of the overall memory map. If the data processing system is used in a real-time application system, it may be useful during development to temporarily overlay small blocks of readily programmed memory (e.g. SRAM (static random access memory)) over a portion of more difficult to program memory (e.g. flash EEPROM (electrically erasable programmable read only memory) or ROM (read only memory)) in order to allow the values obtained from the memory to be temporarily changed more readily. Then when development has been completed, the final real-time system will use the more difficult to program memory instead of the SRAM which was used during development. Frequently the more difficult to program memory is formed on the same integrated circuit as other parts of the data processing system, while the more readily programmed memory used during development is formed on a separate integrated circuit.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

In developing the software for a real-time system, it is frequently a requirement to be able to quickly and easily modify values fetched from a region of memory to assist with the tuning and calibration of parameters of the system. Many different parameters may need to be adjusted during development to optimize the operation of the real-time system. In many systems, once development of the system has been completed, the final results of the tuning process will be committed to values stored in a large non-volatile memory, often embedded in a System on Chip (SoC).

In many cases, the memory used during development (e.g. off-chip SRAM) has different timing characteristics than the memory used in the final real-time system (e.g. on-chip flash EEPROM, ROM). For some real-time systems, such as automotive control systems, it may be desirable to require that the final real-time system have the same timing characteristics as were used during development in order to reduce the likelihood of failure in the final real-time system. This requirement may be used even if it requires the access time for a portion of memory to be intentionally slowed to match the access time used during development. In some real-time systems, reliability is more important that system speed performance.

Note that for some data processing systems, the regions of memory to be overlayed during development may be scattered across the memory map. As a result, the granularity of blocks of the memory map for which it may be desirable to independently control timing specifications may be fairly fine. Thus using control registers to store memory timing specifications may require a prohibitively large number of control registers to be able to cover the scattered regions of memory. Another approach to independently specifying a timing characteristic of many scattered blocks of memory was needed that did not required a large number of control registers.

Figure 1:
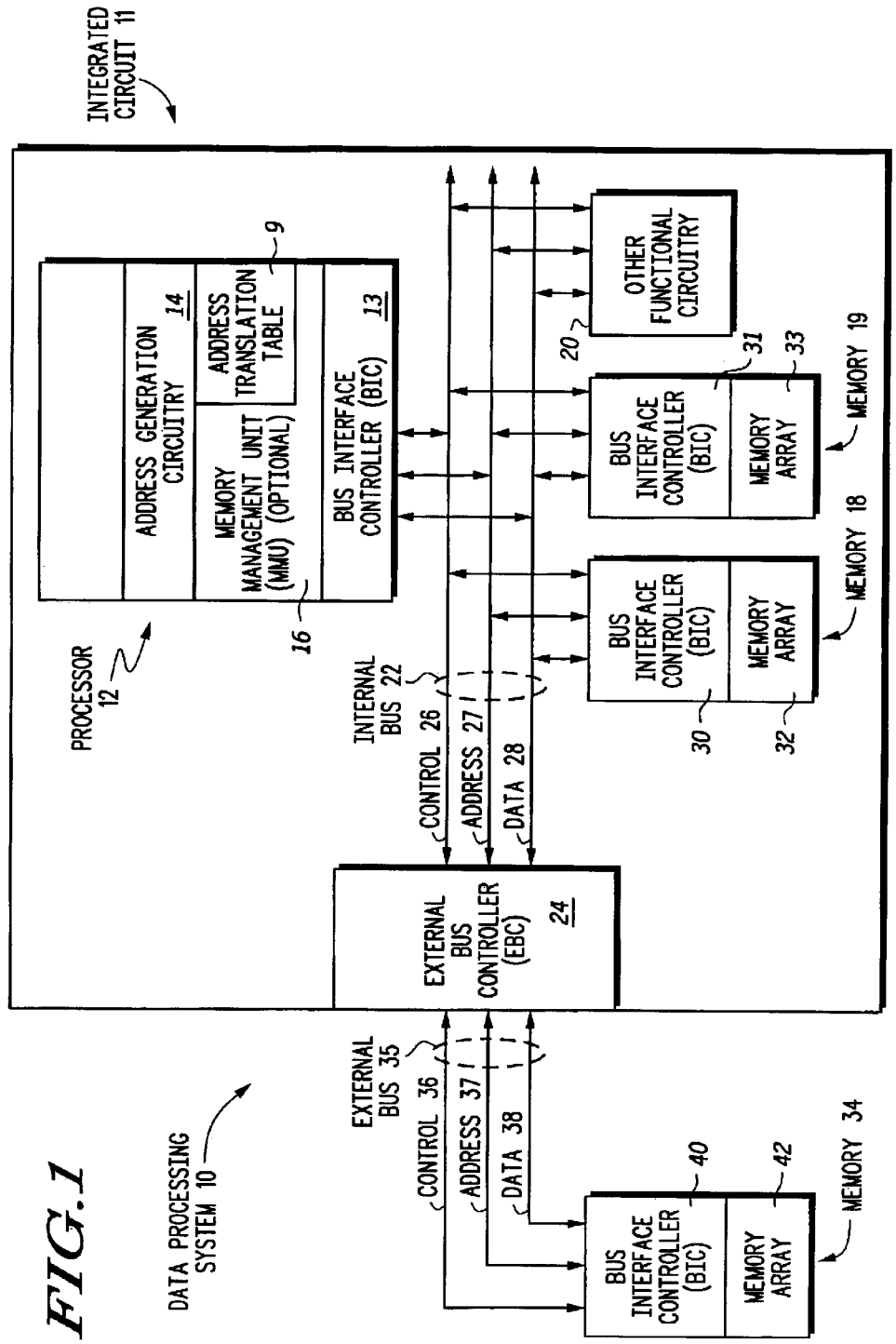
FIG. 1 illustrates, in block diagram form, a data processing system 10 in accordance with one embodiment of the present invention.

Referring to FIG. 1, in one embodiment, data processing system 10 includes a processor 12, memory 18, memory 19, other functional circuitry 20, and external bus controller (EBC) 24 which are bi-directionally coupled by way of internal bus 22. Internal bus 22 includes control signals 26, address signals 27, and data signals 28. Processor 12 includes a bus interface controller (BIC) 13 which bi-directionally couples processor 12 to control signals 26, address signals 27, and data signals 28. Memory 18 includes a memory array 32 and a bus interface controller (BIC) 30. BIC 30 bi-directionally couples memory 18 to control signals 26, address signals 27, and data signals 28. Memory 19 includes a memory array 33 and a bus interface controller (BIC) 31. BIC 31 bi-directionally couples memory 19 to control signals 26, address signals 27, and data signals 28. Other functional circuitry 20 is bi-directionally coupled to control signals 26, address signals 27, and data signals 28. External bus controller (EBC) 24 is bi-directionally coupled to control signals 26, address signals 27, and data signals 28. Note that in different embodiments of the present invention, processor 12, memory 18, memory 19, other functional circuitry 20, and EBC 24 may be coupled to any desired portions of internal bus 22 which allow these blocks to perform their respective functions. Thus in some embodiments, not all of the blocks 12, 18–20, and 24 need to be coupled to all of the signals of internal bus 22. Note also that for some embodiments of the present invention, at least a portion of control signals 26 and 36 may be used to transfer status information.

Processor 12 includes address generation circuitry 14. Some embodiments of processor 12 may include a memory management unit 16. Memory management unit 16 may include address translation table 9. However, memory management unit 16 is optional and address translation table 9 may be located anywhere appropriate in data processing system 10, or itself may be optional. Other functional circuitry 20 may perform any desired function. Some examples of functions which may be performed by other functional circuitry 20 are timers, an input/output port, a communications port (e.g. a serial communications port, a serial peripheral interface, etc.), drivers (e.g. LCD drivers), an analog-to-digital converter, a digital-to-analog converter, additional memory, a DMA device, or any other desired function.

External bus controller (EBC) 24 is used to bi-directionally couple internal bus 22 and external bus 35. Integrated circuit 11 is bi-directionally coupled to memory 34 by way of external bus 35. External bus 35 includes control signals 36, address signals 37, and data signal 38. Memory 34 includes a memory array 42 and a bus interface controller (BIC) 40. BIC 40 bi-directionally couples memory 34 to control signals 36, address signals 37, and data signals 38. In alternate embodiments of the present invention, memory 34 and integrated circuit 11 are implemented on different integrated circuits. In yet other embodiments of the present invention, various portions of data processing system 10 are implemented on different integrated circuits or the same integrated circuit.

Although data processing system 10 has been illustrated as having memories 18, 19, and 34, alternate embodiments of the present invention may have any desired number of memories implemented on integrated circuit 11 (e.g. memories 18 and 19) and any desired number of memories implemented external to integrated circuit 11 (e.g. memory 34). In addition, memory 18, memory 19, and memory 34 may be any type of memory: including, but not limited to static random access memory (SRAM), dynamic random access memory (DRAM), read only memory (ROM), erasable programmable read only memory (EPROM), electrically erasable programmable read only memory (EEPROM), magnetic random access memory (MRAM), etc. Note that memories 18, 19, and 34 may be the same, or different, types of memories.

Figure 2:
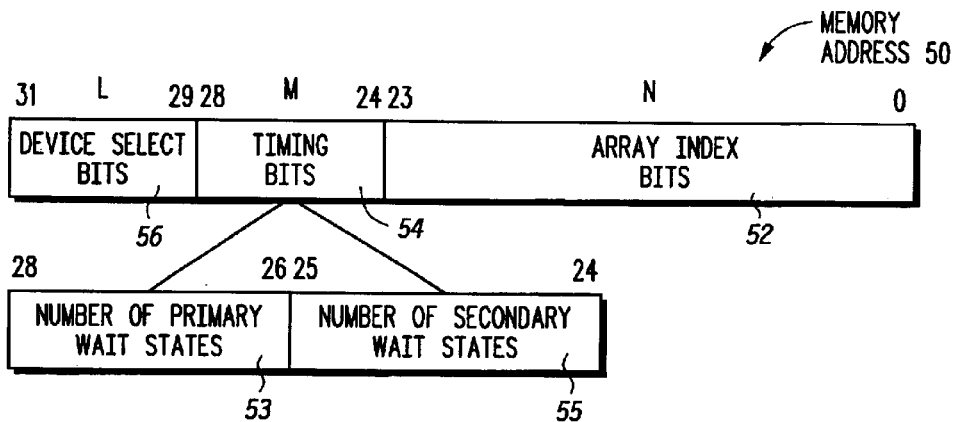
FIG. 2 illustrates, in block diagram form, a memory address 50 in accordance with one embodiment of the present invention.

Referring to FIG. 2, memory address 50 may be used to access any memory (e.g. 18, 19, 34) in data processing system 10. Memory address 50 may be provided by address generation circuit 14 within processor 12, or may be provided by any other source of address generation within data processing system 10, including other functional circuitry 20. In the illustrated example of memory address 50, the lower order N-bits [0–23] are used as array index bits 52 to index into one of memory arrays 32, 33, or 42. The next significant M-bits [24–28] are used as timing bits 54 to specify a timing parameter of one of memory arrays 32, 33, or 42.

Note that it is common for the memories 18, 19, and 34 to have one or more timing parameters that are different. One example is the number of wait cycles or wait states required to access the memory. In some embodiments of the present invention, timing bits 54 include a plurality of timing parameters, such as a parameter specifying a number of primary wait states 53 [bits 26–28], and a parameter specifying a number of secondary wait states 55 [bits 24–25]. Primary wait states refer to the wait states of an initial access in a burst of accesses. Secondary wait states refer to the wait states for one or more subsequent accesses in a burst of accesses. It is common for burst accesses to require different timing parameters for the different portions of the burst transfer. Alternate embodiments of the present invention may use timing bits 54 to specify any timing parameter of a memory in data processing system 10. In addition, note that alternate embodiments of the present invention may use a portion of an access address (e.g. bits 54) to specify one or more non-timing parameters or attributes of the circuitry being accessed. In the memory address 50 illustrated in FIG. 2, the most significant L-bits [29–31] are used as device select bits 56 to select one of memory arrays 32, 33, or 42. Note that alternate embodiments of the present invention may partition memory address 50 into fewer, more, or different partitions, and the number of bits in each partition may vary as well.

Note that memory address 50 of FIG. 2 now has a portion (timing bits 54) which are not used to differentiate between devices or storage locations within a device. These bits (timing bits 54) are instead used to specify a timing characteristic of the device selected by device select bits 56. To implement this in some embodiments of the present invention, a memory array (e.g. 32, 33, 42) is multiple-mapped in the physical memory map 70 of processor 12 (see FIGS. 1 and 3) and the address bits 54 associated with the multiple-mapping are used to directly control timing parameters of the memory arrays (e.g. 32, 33, 42) with no indirect access to a control register required. This allows for flexible timing specification to be derived on an access by access basis without requiring any additional control storage overhead.

Some embodiments of the present invention take advantage of the fact that the address space of a typical data processing system 10 is sparse, and thus multiple-mapping may be used and a portion of the memory address 50 used for accesses (e.g. timing bits 54) can be redirected for use as a timing specifier. By multiple mapping of the memory, a number of different values of address 50 may be used to select the same location in memory. Selection of particular values for address 50 in which the timing bits 54 are different but in which the values of device select bits 56 are common, and array index bits 52 are common result in an access to the same location in memory, but using a different set of one or more timing parameters corresponding to timing bits 54. The user of the data processing system 10 may then directly control timing bits 54 to select a desired set of timing attributes independently of the actual data location in a memory array by generating appropriate values of memory address 50.

In addition, the present invention allows the specification of memory timing parameters to be altered more efficiently as system conditions (e.g. operating clock frequency) are changed. The present invention does not require the individual bus interface controllers (30, 31, 40) for each memory (18, 19, 34) to be reprogrammed when a system condition is changed. Instead, the timing bits 54 in the memory address 50 itself are the only thing that must be modified by the user of data processing system 10. Thus, the present invention allows for faster transitions into different clocking modes which are relied upon for low power system operation. Low power system efficiency is thereby improved, since the transitions into and out of low power (low frequency) modes can be performed with lower software overhead, thus lowering the threshold for which a mode change is actually beneficial. With electronics being used in more and more handheld battery operated applications, any improvement that can reduce battery power consumption is important.

Figure 3:
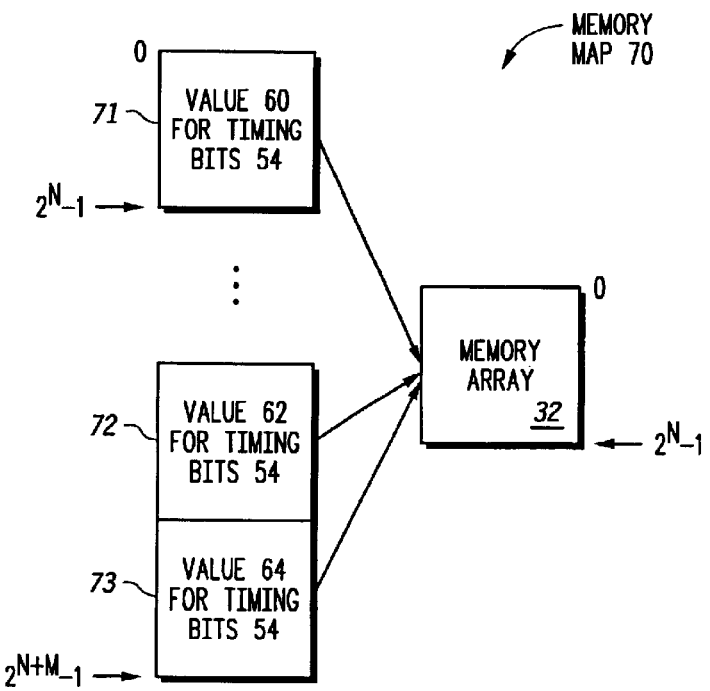
FIG. 3 illustrates, in block diagram form, a memory map 70 in accordance with one embodiment of the present invention.

FIG. 3 illustrates one embodiment of a memory map 70 for memory array 32 of FIG. 1. In the illustrated embodiment, memory array 32 is accessed by N array index bits 52 (see FIG. 2). Memory array 32 thus has address locations 0 to $2^N-1$. Memory array 32 can be mapped into memory map 70 multiple or a plurality of times as memory block 71, 72, and 73. Referring to FIG. 2, the array index bits 52 and the device select bits 56 will be the same for each block 71–73 of FIG. 3; however, the timing bits 54 can be different or the same for each of blocks 71–73. For example, block 71 can have a value 60 for timing bits 54, while block 72 has a value 62 for timing bits 54, and block 73 has a value 64 for timing bits 54. Values 60, 62, and 64 determine which of the multiple mappings of memory array 32 are used during an access. Also, there may be any number of blocks 71–73 mapped into memory array 32. In the illustrated embodiment, each block 71–73 is the same size; however each block includes a different range of address locations in memory map 70. The first block, block 71, starts at address location 0 and ends at address location $2^N-1$. Block 72 and all other intervening blocks (not shown) are each $2^N$ in size. The last block, block 73 is $2^N$ in size and ends at address location each $2^{N+M}-1$, where M is the number of bits used for timing bits 54 (see FIG. 2).

Using numbers in a specific example, if memory 18 (see FIG. 1) is 1 megabyte (Mbyte) in size, it requires 20 address lines (N=20) to select a byte of data within the memory array 32. By multiple-mapping memory array 32 four times such that it appears to occupy a 4 Mbyte region in the memory map (thus allocating 22 address lines to memory array 32), these two extra bits are available as timing bits 54 to specify a timing parameter on an access by access basis. These two extra bits, as timing bits 54, are not needed to select the data stored in memory array 32 since the data appears in four different virtual copies due to the address aliasing. Instead, these two high-order bits are used to directly indicate a timing parameter (e.g. access time) to be applied to that particular block (e.g. 71–73) within memory array 32. In some embodiments of the present invention, timing bits 54 may be divided into a plurality of portions, where each portion may be used to specify a different timing parameter of memory array 32. In addition, one or more portions of timing bits 54 may specify non-timing related parameters.

Figure 4:
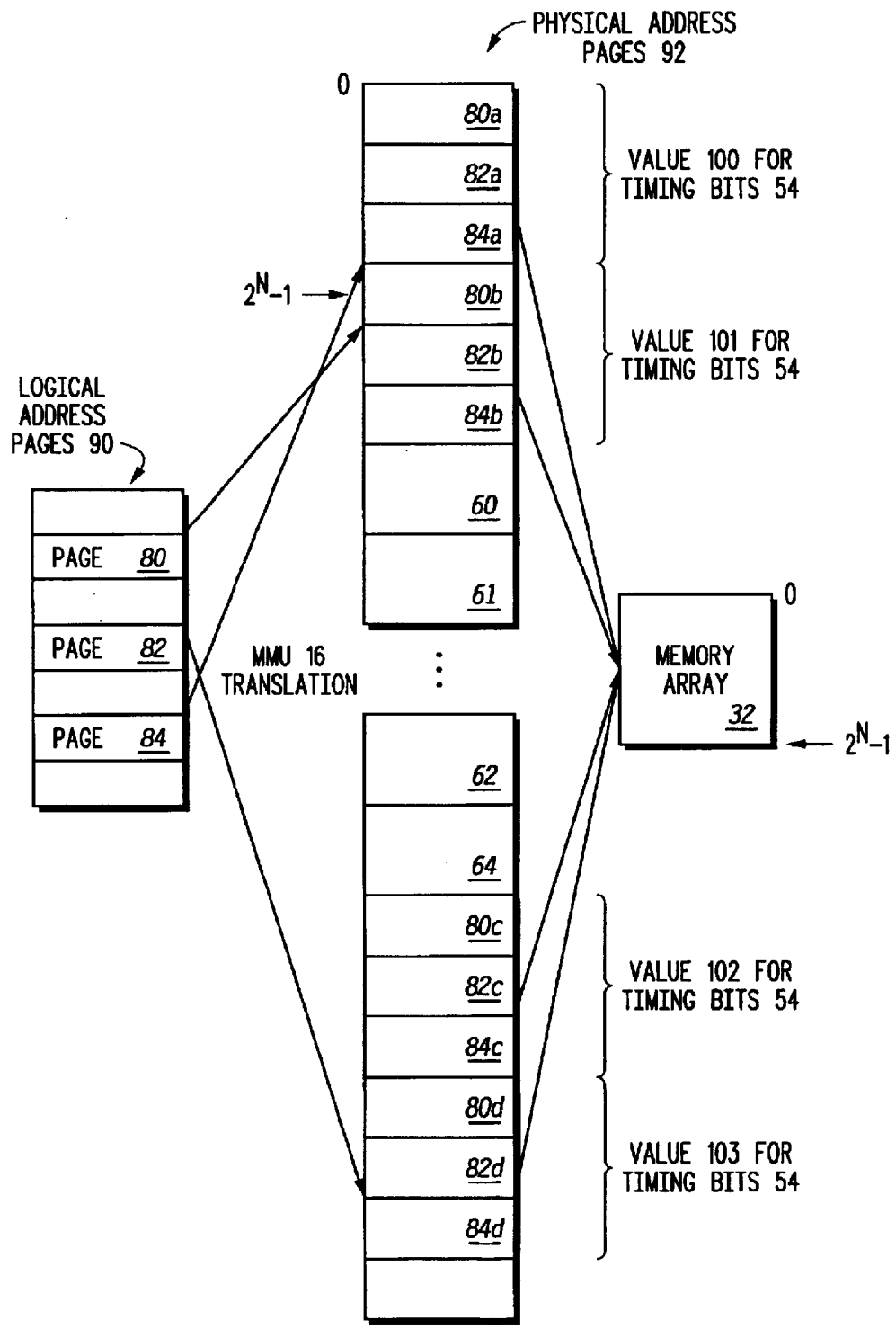
FIG. 4 illustrates, in block diagram form, an example of memory management unit (MMU) 16 translation in accordance with one embodiment of the present invention.

FIG. 4 illustrates an example of memory management unit (MMU) 16 address translation (see FIG. 1). Note that an MMU 16 is optional. In FIG. 4, logical address pages 90 include page 80, page 82, and page 84. Note that each logical address page 80, 82, and 84 may be mapped into a corresponding physical address page by MMU 16. Each logical page may be mapped into any physical page, giving complete flexibility in assigning a physical page address to a corresponding logical page address. As illustrated in FIG. 4, the physical address pages 92 correspond to 4 different blocks (e.g. blocks like 71–73 in FIG. 3) denoted by "a", "b", "c", and "d", which are multiple-mapped into memory array 32. Value 100 for timing bits 54 applies to physical address pages 80a, 82a, and 84a. Value 101 for timing bits 54 applies to physical address pages 80b, 82b, and 84b. Then blocks 60, 61, 62, and 64 occupy the next blocks of physical addresses. Value 102 for timing bits 54 applies to physical address pages 80c, 82c, and 84c. Value 103 for timing bits 54 applies to physical address pages 80d, 82d, and 84d.

Note that an MMU 16 is not required to practice the present invention, but that the present invention may indeed be used when an MMU 16 is utilized. One advantage of utilizing an MMU is that the logical to physical address mapping may be used to change the mapping of a logical page in order to select a different value for timing bits 54 with no program modification of logical addresses, and utilizing the already existing capability of address translation table 9 of FIG. 1. For example, by mapping logical page 84 to physical page 84a in FIG. 4, value 100 is used for timing bits 54. Alternatively, when a different selection of timing is needed, logical page 84 may be mapped to physical page 84b to select value 101 for timing bits 54. Regardless of which of these mappings is used, the same value in memory array 32 is accessed, since memory array 32 is multiple-mapped to multiple locations in physical address space (physical address pages 92), each multiple mapping corresponding to a different value for timing bits 54.

Note that alternate embodiments of the present invention may utilize this multiple-mapping technique on elements other than memory arrays to control timing parameters.

Also, in alternate embodiments of the present invention, the timing bits 54 associated with the multiple-mappings may be used for other control purposes such as controlling an operating mode of one or more portions of data processing system 10, or controlling a response from one or more elements of data processing system 10.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for continuing memory access timing in a processing system comprising a first memory having a first memory access timing characterization and a second memory having a second memory access timing characterizations comprising:

providing an address to the first memory;

directly using a portion of the address to modify the first memory access timing characterization to a different memory access timing characterization; and implementing the portion of the address used to modify the first memory access timing characterization as additional address bits beyond what is required to address the first memory.

2. The method of claim 1 further comprising:

implementing the different memory access timing characterization as the second memory access timing characterization of the second memory.

3. The method of claim 1 further comprising:

decoding the portion of the address prior to modifying the first memory access timing characterization.

4. The method of claim 1 further comprising:

implementing the first memory as a flash nonvolatile memory; and implementing the second memory as a static random access memory (SRAM), wherein the first memory access timing characterization is slowed to implement the different memory access characterization.

5. The method of claim 1 further comprising:

implementing an address translation by translating a predetermined single logical address to one of a plurality of physical addresses, each of the plurality of physical addresses containing a predetermined one of a plurality of differing timing characterizations for the first memory.

6. The method of claim 1 further comprising:

providing the address to the first memory in response to execution of a software program wherein timing control of the first memory is programmed by a user.

7. The method of claim 1 wherein a total number of the additional address bits determine how many access timing characterization may be implemented as the different memory access timing characterization.

8. The method of claim 1 further comprising:

modifying the first memory access timing characterization to a different memory access timing characterization for each of a plurality of separate blocks of the first memory.

9. The method of claim 1 further comprising:

selecting a value of the portion of the address that modifies the first memory access timing characterization based upon an operating mode of the processing system, thereby optimizing memory timing based upon operating conditions.

10. The method of claim 1 further comprising:

operating the first memory to have memory access timing that approximates the second memory.

11. A method for controlling an operating parameter in a processing system comprising a bus master for providing an address to a receiving device, comprising:

encoding a portion of the address with operating parameter control information;

communicating the address to the receiving device;

directly using the portion of the address to modify the operating parameter of the receiving device; and implementing the portion of he address as additional address bits beyond what is required for addressing.

12. The method of claim 11 further comprising:

implementing the receiving device as a memory and encoding the portion of the address with memory access timing information to modify an access characteristic of the memory.

13. The method of claim 11 further comprising:

implementing the bus master and the receiving device on a same integrated circuit; and modifying the operating parameter by slowing an operating characteristic of the receiving device to accommodate compatibility with circuitry located external to the integrated circuit.

14. A data processing system comprising:

a bus;

a bus master coupled to the bus;

a first memory coupled to the bus and hiving a first memory access timing characterization, the first memory receiving an address from the bus master and directly using a portion of the address to modify the first memory access timing characterization to a different memory access timing characterization; and circuitry coupled to the first memory for decoding a predetermined number of bits of the address provided by the bus master to determine the different memory access timing characterization, the predetermined number of bits being additional address bits beyond what is required to address the first memory.

15. The data processing system of claim 14 further comprising:

a second memory coupled to the bus, the second memory having a second memory access timing characterization that is slower than the first memory access timing characterization, the different memory access timing characterization being substantially the second memory access timing characterization.

16. The data processing system of claim 15 wherein the first memory is a flash memory and the second memory is an SRAM that has slower memory access timing than the flash memory.

17. The data processing system of claim 14 wherein a total number of the additional address bits determine how many access timing characterizations may be implemented as the different memory access timing characterization.

18. The data processing system of claim 14 wherein the bus mater further comprises:

address translation circuitry for implementing an address translation by translating a predetermined single virtual address to one of a plurality of physical addresses associated with the first memory, each of the plurality of physical addresses containing a predetermined one of a plurality of differing timing characterizations for the first memory.

19. The data processing system of claim 14 wherein the address further comprises a field that uniquely identifies and addresses the first memory.

20. In a data processing system, circuitry for generating addresses to control operations within the data processing system comprising:

a bus;

address generation circuitry;

a memory management unit coupled to the address generation circuitry, the memory management unit having an address translation table for translating a logical address to one of a plurality of physical addresses, each of the plurality of physical addresses containing a predetermined one of a plurality of operating parameters for a predetermined component of the data processing system that is coupled to the bus, wherein the predetermined one of the plurality of operating parameters is stored as part of at least one of the plurality of physical addresses without said part of at least one of the plurality of physical addresses being used as a pointer for addressing the predetermined one of the plurality of operating parameters.

21. The data processing system of claim 20 wherein the predetermined component is a memory and the plurality of operating parameters are memory timing access parameters.

* * * * *

UNITED STATES PATENT AND TRADEMARK OFFICE
CERTIFICATE OF CORRECTION

PATENT NO. : 6,925,542 B2  Page 1 of 1
APPLICATION NO. : 10/393592
DATED : March 21, 2003
INVENTOR(S) : William C. Moyer It is certified that error appears in the above-identified patent and that said Letters Patent is hereby corrected as shown below:

In Column 6, Line 30, Claim No. 1:
  Change "continuing" to --controlling--

In Column 6, Line 33, Claim No. 1:
  Change "characterizations" to --characterization--

In Column 7, Line 3, Claim No. 7:
  Change "characterization" to --characterizations--

In Column 7, Line 28, Claim No. 11:
  Change "of he" to --of the--

In Column 7, Line 45, Claim No. 14:
  Change "and hiving" to --and having--

In Column 8, Line 21, Claim No. 18:
  Change "bus mater" to --bus master--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO.       : 6,925,542 B2                          Page 1 of 1
APPLICATION NO.  : 10/393592
DATED            : August 2, 2005
INVENTOR(S)      : William C. Moyer It is certified that error appears in the above-identified patent and that said Letters Patent is hereby corrected as shown below:

In Column 6, Line 30, Claim No. 1:
    Change "continuing" to --controlling--

In Column 6, Line 33, Claim No. 1:
    Change "characterizations" to --characterization--

In Column 7, Line 3, Claim No. 7:
    Change "characterization" to --characterizations--

In Column 7, Line 28, Claim No. 11:
    Change "of he" to --of the--

In Column 7, Line 45, Claim No. 14:
    Change "and hiving" to --and having--

In Column 8, Line 21, Claim No. 18:
    Change "bus mater" to --bus master--

This certificate supersedes the Certificate of Correction issued May 13, 2008.

Signed and Sealed this

Third Day of June, 2008

JON W. DUDAS
*Director of the United States Patent and Trademark Office*